Sept. 6, 1966 G. WIELAND ET AL 3,271,087
CAGE FOR BALL OR ROLLER BEARINGS
Filed Oct. 16, 1963
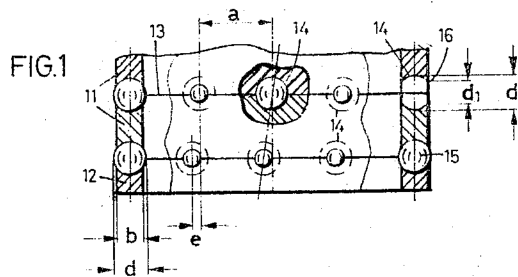
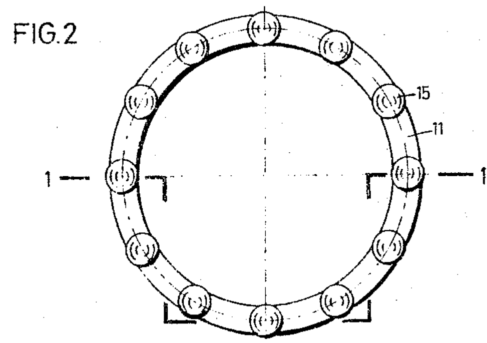
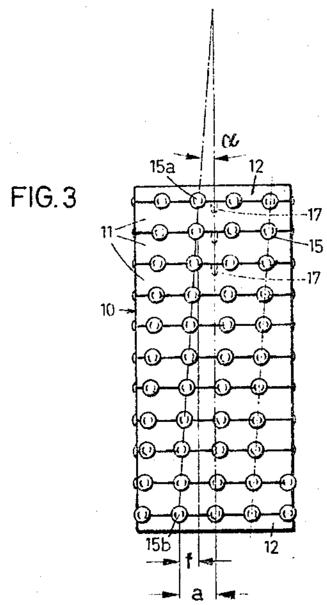
INVENTORS
Gerhard Wieland
Robert Blassnitz
BY
Michael J. Striker
ATTORNEY United States Patent Office 3,271,087

Patented Sept. 6, 1966

3,271,087
CAGE FOR BALL OR ROLLER BEARINGS

Gerhard Wieland, Gochsen, and Robert Blassnitz, Wustenrot-Hasenhof, near Heilbronn, Germany, assignors to Fischer-Brodbeck G.m.b.H.

Filed Oct. 16, 1963, Ser. No. 316,678
Claims priority, application Germany, Oct. 18, 1962, F 38,080
8 Claims. (Cl. 308—6)

The invention relates to a cage for ball or roller bearings of the kind used for guiding an inner member relative to an outer member, and relates particularly to the special construction of the cage and to the method of making it. Cages of this sort for rotary and axial movements are used in machines, tools and other devices and in other applications particularly where an accurate tight-fitting bearing which is relatively easy running is required. It is an object of the present invention to provide a cage for such a bearing which also provides a long service life with little maintenance.

Cages for ball or roller bearings of the present kind are usually made from a metal tube in which the seats for the balls are cut by a special boring machine. The manufacture of a cage of this kind is expensive and, in particular, the boring of the ball seats is a tedious and time-consuming operation.

A further object of the present invention is to provide a cage so constructed that it allows simple, rapid and inexpensive manufacture. In particular the intention here is to achieve a construction such that the balls can be easily inserted into the cage after the latter has been completed, and whereby no additional or special retaining device is required to keep the balls in their sockets.

A further object of the invention is to provide a cage which is outstanding by virtue of its light weight and its especially good running properties.

A still further object of the invention is the provision of a cage in which the race-tracks for the balls are subjected to little wear, with the result that even after long service the accuracy of guiding is impaired to only a small extent, if at all.

According therefore to the present invention, there is provided a cage adapted to receive and retain a plurality of rolling elements of a ball or roller bearing, said cage comprising a plurality of rings made of synthetic resin material, adjacent faces of the rings being provided with grooves, the grooves of each adjacent pair of rings co-operating to form sockets for the rolling elements.

The term "roller" where used in this specification is intended to include "needle" rollers used in "needle bearings."

The grooves may be substantially semi-circular in cross section and are preferably hemi-spherical.

Some of the rings may be provided with grooves in both their end faces, the grooves in one end face being displaced circumferentially with respect to the grooves in the other end face. Preferably the circumferential distance between a groove in one end face and the closest groove in the other end face is less than the radius of the groove. In a preferred embodiment the circumferential displacement between the grooves in one end ring of the cage and the grooves in the opposite end ring of the cage is less than the circumferential displacement between adjacent grooves in any one ring.

The rings may be fastened together with adhesive, or may be fused one to the other.

According to another aspect of the present invention, there is provided a cage as set forth above, having rolling elements disposed within the sockets, the diameter of the rolling elements being larger than the thickness of the rings, whereby the rolling elements project above the inner and outer surfaces of the rings.

In a preferred arrangement, the rolling elements are larger than the inlets to said sockets, and are thus retained within the sockets by deformable portions of the rings disposed about the inlets to said sockets.

According to another aspect of the invention, a method of making a cage as set forth above comprises moulding a plurality of rings of synthetic resin material such that the rings are provided with grooves, and attaching the rings together such that the grooves of each adjacent pair of rings co-operate to form sockets for the retention of rolling elements.

No special production process for boring the ball seats is required with the present case because the sockets are already formed during the injection-moulding of the rings and the complete seat for the ball is provided as soon as the cage is assembled, without any necessity for subsequent re-working. Moreover the openings left at the outer and inner cage surfaces after the cage has been assembled have diameters less than that of the ball, with the result that the ball is prevented with certainty from escaping from its seat and there is no need to provide additional arrangements for this purpose. On the other hand, these openings through which the ball projects are preferably made of just such a size that the ball, after assembly of the cage, can be pushed through the opening into the sockets, the synthetic resin material stretching elastically to allow this to be done.

The invention allows cages to be made of any length at little cost.

A further advantage provided by making the cage of synthetic resin material is that of low weight, of great advantage at high speeds because there is little tendency for the cage to wander axially. Moreover the synthetic resin material is self-lubricating, sound-absorbent and comparatively inexpensive per pound of weight.

The invention is illustrated, merely by way of example, in the accompanying drawings, in which:

FIGURE 1 is an axial section through part of a cage according to the present invention, the section being taken at line 1 to 1 of FIGURE 2.

FIGURE 2 is an end view of the cage shown in FIGURE 1, and

FIGURE 3 is a plan view of a cage according to the present invention.

Referring to the drawings, a cage 10 for balls 15 of a ball bearing is formed of a number of rings 11 and 12 moulded from synthetic resin material, e.g., a polyamide. Each ring 11 is provided on each of its end faces 13 with grooves 14 which are hemi-spherical. The rings 11 are fastened together with an impact adhesive such that the grooves 14 of adjacent rings 11 form substantially complete spherical sockets of a diameter somewhat greater than the diameter of balls 15. End rings 12 are equivalent to one half of any ring 11, being provided with grooves 14 in one face only.

From the figures it will be seen that the radial thickness $b$ of each ring 11 is less than the diameter $d$ of the balls, whereby the balls 15 protrude beyond the external and internal surfaces of the cage.

Before assembling the rings 11 and 12, their contact surfaces are treated with adhesive and/or subjected to a heat-treatment, with the result that upon joining them together there results a strong and firmly bonded cage capable of taking high loads in tension, shear and torsion without rupture of the bond.

As shown in FIGURE 1, the grooves 14 on one end face of each ring 11 are circumferentially displaced relative to the corresponding grooves 14 on the opposite end face of the same ring 11, by the distance $e$ which is small compared to the spacing $a$ between any two adjacent grooves 14 on a ring 11. The resulting cage is shown in FIGURE 3 from which it will be seen that all sockets forming an axial row lie in a line inclined by the small angle $\alpha$ to the axis of the column, whereby the total circumferential displacement $f$ between a ball 15*a* in one end of the cage and a ball 15*b* in the other end of the cage, is less than the spacing $a$ between two adjacent balls in any ring 11. With this arrangement, axial movement between any two machine parts which are supported by the bearing shown, causes each individual ball 15 to roll along its own individual track without crossing the track of any other ball 15, whereby "grooving" of the machine parts is prevented or at least reduced.

To locate the rings 11 precisely in relation to each other locating pins 17 are provided on one contact face of each ring 11, the pins 17 fitting into corresponding holes in the mating face of each adjacent ring 11.

By providing a cage made of synthetic resin material, or relatively light, self-lubricating yet strong structure is obtained which can be readily moulded to provide the sockets required for balls 15. Thus injection moulding of the rings 11 in the present device is generally much simpler and less expensive than machining sockets to form ball seats in a solid metal cylinder which is usually used as the cage in such devices. Again, since the sockets can be made spherical, there is no need to provide additional means for preventing the balls from leaving the sockets, since the relatively narrow inlet to the sockets retains the balls 15 within the sockets of the present device.

Although the invention has been described with reference to its use with ball bearings, which can be used for axial or rotary movement, it will be appreciated that the invention is equally applicable to roller and needle bearings, which are used for uni-directional movement only. The sockets formed for use with rollers or needles would, of course, be cylindrical, the cross section of grooves 14 still being semi-circular.

We claim:

1. A cage adapted to receive and retain a plurality of rolling elements of a bearing, the cage comprising a plurality of rings made of synthetic resin material, grooves spaced in circumferential direction from each other being formed in each of the end faces of said rings, the grooves of each adjacent pair of rings co-operating to provide sockets for the rolling elements, the grooves in one end face of any one ring being displaced circumferentially with respect to the grooves in the other end face of the same ring.

2. A cage adapted to receive and retain a plurality of rolling elements of a bearing, the cage comprising a plurality of rings made of synthetic resin material, grooves spaced in circumferential direction from each other being formed in each of the end faces of said rings the grooves of each adjacent pair of rings co-operating to provide sockets for the rolling elements, the grooves in one end face of any one ring being displaced circumferentially with respect to the grooves in the other end face of the same ring by a circumferential distance which is less than the radius of the grooves.

3. A cage adapted to receive and retain a plurality of rolling elements of a bearing, the cage comprising a plurality of rings made of synthetic resin material, grooves spaced in circumferential direction from each other being formed in each of the end faces of said rings, the grooves of each adjacent pair of rings co-operating to provide sockets for the rolling elements, the grooves in one end ring of the cage being displaced circumferentially with respect to the grooves in the other end ring of the cage by a distance which is less than the circumferential displacement between adjacent grooves in any one ring.

4. A ball bearing cage comprising, in combination, a stack of superimposed rings abutting with end faces thereof against each other, each of said rings with the exception of the rings at the opposite ends of the stack being formed in each of the opposite end faces thereof with circumferentially spaced depressions having substantially hemispherical surfaces and extending from the respective end face into the ring and each having a diameter greater than the width of the respective ring, the depressions in abutting end faces being aligned with each other so as to form sockets for balls to be retained in said aligned depressions, the depressions in one of the opposite end faces in any one ring are displaced in circumferential direction with respect to the depressions in the other end face of the same ring and said substantially hemi-spherical surfaces intersecting the inner and outer peripheral surfaces of said rings to form at said peripheral surfaces openings having each a diameter smaller than that of said hemi-spherical surfaces so that balls located in said sockets and having each a diameter substantially equal to that of said hemi-spherical surfaces will be securely retained in said sockets.

5. A ball bearing cage as set forth in claim 4, wherein said rings are made from synthetic resin material.

6. A ball bearing cage as set forth in claim 5, wherein said rings are joined at the end faces thereof to each other by an adhesive.

7. A ball bearing cage as set forth in claim 5, wherein said rings are fused together at the end faces thereof by application of heat.

8. A ball bearing cage as set forth in claim 4, wherein the depressions in the ring at one end of said stack are circumferentially displaced relative to the depressions in the ring on the other end of said stack by a distance which is smaller than the circumferential displacement between adjacent centers of the depressions on the end face of any one ring.

References Cited by the Examiner

UNITED STATES PATENTS

| | | | |
|---|---|---|---|
| 456,955 | 8/1891 | Howard | 29—141.5 |
| 1,209,772 | 12/1916 | Slate | 308—180 |
| 2,025,721 | 12/1935 | Broulhiet | 308—6 |
| 2,468,171 | 4/1949 | Carlson. | |
| 2,848,791 | 8/1958 | Neese | 29—148.4 |
| 2,861,849 | 11/1958 | Case | 308—201 |
| 2,897,582 | 8/1959 | Blazek | 29—148.4 |
| 3,027,206 | 3/1962 | Potter | 308—201 |
| 3,075,278 | 1/1963 | Bratt | 308—217 |

FOREIGN PATENTS

| | | |
|---|---|---|
| 594,696 | 3/1960 | Canada. |
| 710,389 | 6/1954 | Great Britain. |

DAVID J. WILLIAMOWSKY, *Primary Examiner.*

ROBERT C. RIORDON, DON A. WAITE, FRANK SUSKO, *Examiners.*

F. C. HAND, *Assistant Examiner.*